United States Patent [19]

Reinert

[11] 4,306,542
[45] Dec. 22, 1981

[54] SOLAR GREENHOUSE

[75] Inventor: Charles P. Reinert, Garvin, Minn.

[73] Assignee: Solarein, Inc., Buffalo, Minn.

[21] Appl. No.: 122,487

[22] Filed: Feb. 19, 1980

[51] Int. Cl.³ .................... F24J 3/02; A01B 79/00
[52] U.S. Cl. ...................... 126/429; 47/58; 126/449; 126/901
[58] Field of Search ............... 126/429, 431, 441, 444, 126/445, 449, 450, 901; 47/58, 17, 29

[56] References Cited

U.S. PATENT DOCUMENTS

| | | | |
|---|---|---|---|
| 3,352,058 | 11/1967 | Brant | 47/58 |
| 3,875,925 | 4/1975 | Johnston | 126/449 |
| 4,004,380 | 1/1977 | Kwake | 126/416 |
| 4,018,213 | 4/1977 | Mann | 126/428 |
| 4,067,316 | 1/1978 | Brin et al. | 126/449 |
| 4,084,573 | 4/1978 | Shubert | 126/429 |
| 4,108,373 | 8/1978 | Chiapale et al. | 126/431 |
| 4,129,117 | 12/1978 | Harvey | 126/449 |
| 4,186,721 | 2/1980 | Whitman | 126/449 |
| 4,212,292 | 7/1980 | Reinert | 126/449 |

FOREIGN PATENT DOCUMENTS 587222  1/1978  U.S.S.R. ............................. 126/431

*Primary Examiner*—Daniel J. O'Connor
*Attorney, Agent, or Firm*—Kinney, Lange, Braddock, Westman and Fairbairn

[57] ABSTRACT

A solar greenhouse utilizing at least one radiant energy transparent or transmitting panel, with a low density fibrous mat positioned to the interior of and having one side generally contiguous to the radiant energy transparent panel, which fibrous mat serves as means for converting radiant energy into heat, and which has fibers carrying (impregnated with or coated with) a fluorescent pigment material. Fluorescent pigments have been proven to enhance plant growth and the mat and panel serve not only as a means for transmitting radiation useful to the plants in the greenhouse, but also serving as an insulation layer. The fibrous mat is preferably sandwiched between two radiant energy transparent panels and the space between the panels serves as a heat collector through which air is passed for removing heat, which can then be used for other purposes.

6 Claims, 3 Drawing Figures

SOLAR GREENHOUSE

BACKGROUND OF THE INVENTION

1. Field of the Invention

The present invention relates to solar greenhouse construction providing insulating and radiant energy transparent panels.

2. Prior Art

In the prior art, construction of fibrous panels which serve as insulation, and also as solar heat collectors, and which have a good deal of radiant energy transparency are shown in U.S. Pat. No. 4,212,292 for SOLAR COLLECTOR. The mats disclosed in said U.S. Pat. No. 4,212,292 have been in public use for more than one year from the data of filing this application and therefore are prior art.

Additionally, various fibrous mats have been utilized in solar collector systems, for example, those shown in U.S. Pat. No. 4,067,316 which provide for chambers filled with a material of a foraminous nature which absorbs solar energy. However, the preferred materials are metals such as aluminum, copper, iron or the like formed into various fibers as from lathe turnings.

The patent to Johnston, U.S. Pat. No. 3,875,925, shows a type of a fibrous mat such as a fabric, metal or synthetic resin mesh which forms a screen through which radiation will pass, and which is made so that it will not permit heat to radiate back out through the mat. In fact, two separate layers of densities of materials are used to achieve the desired result of a heat trap.

Of course, various greenhouse constructions have been advanced in the prior art and the use of fluorescent paint to enhance green plant growth in greenhouses is disclosed in U.S. Pat. No. 3,352,058. However, the pigmented materials are placed upon the surface of the greenhouse walls as disclosed in that patent.

SUMMARY OF THE INVENTION

The present invention relates to a greenhouse construction which has at least one solar energy transmitting panel forming the exterior wall surface or skin of the greenhouse and against which a fibrous mat having a preselected range of low densities is placed, and wherein the fibrous mat is made so that each of the fibers carries fluorescent chemicals which enhance green plant growth by radiating or reemitting radiation in the red or orange portion of the spectrum to enhance the usable solar energy for growing plants. At the same time the mat provides insulation for the greenhouse. The mats are sufficiently solar energy transparent so that at least a portion of the solar energy passes through the mats and the reradiation provides for enhanced green plant growth over that which is obtained with ordinary glass or plastic panels alone.

In a preferred embodiment of the invention, the mat is sandwiched between two radiant energy transparent, imperforate panels to form a solar collector passage directly in the walls of the greenhouse whereby air is passed through the walls (between the imperforate panels), and through the interstitial spaces between the fibers of the mat to transfer heat to the air. The air is then transferred to a desired location such as into the greenhouse itself. The fibers in both instances carry fluorescent chemicals, either by way of pigments sprayed on the outside, or by way of being impregnated in the fibers themselves.

The benefits of insulation qualities of the fibrous mats are achieved to significantly reduce heat losses from greenhouses during cold weather while at the same time providing for transmission of radiant energy usable by the plants in the greenhouse.

DESCRIPTION OF THE PREFERRED EMBODIMENTS

Figure 1:
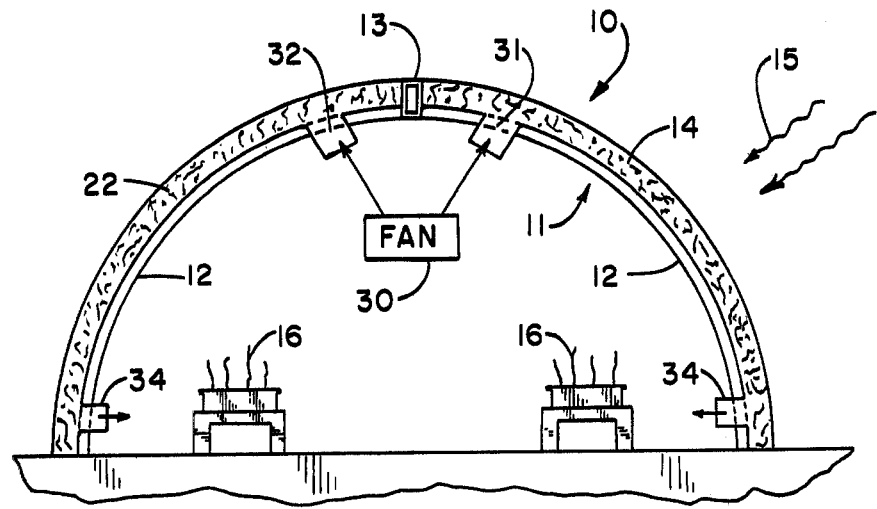
FIG. 1 is a typical vertical cross sectional view of a greenhouse construction shown schematically with walls comprising panels made according to the present invention installed thereon.

A typical showing of a greenhouse 10 includes a frame structure 11 which has curved frame members shown at 12, and at least one longitudinally extending stringer 13. The frame members form an open framework over which an outer cover wall can be mounted. This cover wall is shown at 14 in FIG. 1, and it is to be noted that in certain instances, the outermost layer would be directly mounted over the frame structure 11 or the frame structures can be embedded into the wall if desired. The frameworks used are conventional and shown for illustrative purposes only.

The outer wall or cover panel 14 of the greenhouse has to be capable of transmitting solar energy indicated by the arrows 15, so that the interior of the greenhouse where green plants shown at 16 are growing will receive sufficient radiant energy to sustain plant life and cause growth.

It previously has been found that the use of fluorescent paint or pigment on radiant energy transmitting panels such as glass panels has been effective for enhancing the reradiation of energy at wave lengths that are longer than the absorbed radiation wave lengths. The longer wave length radiant energy is more effective for stimulating and enhancing plant growth.

Figure 2:
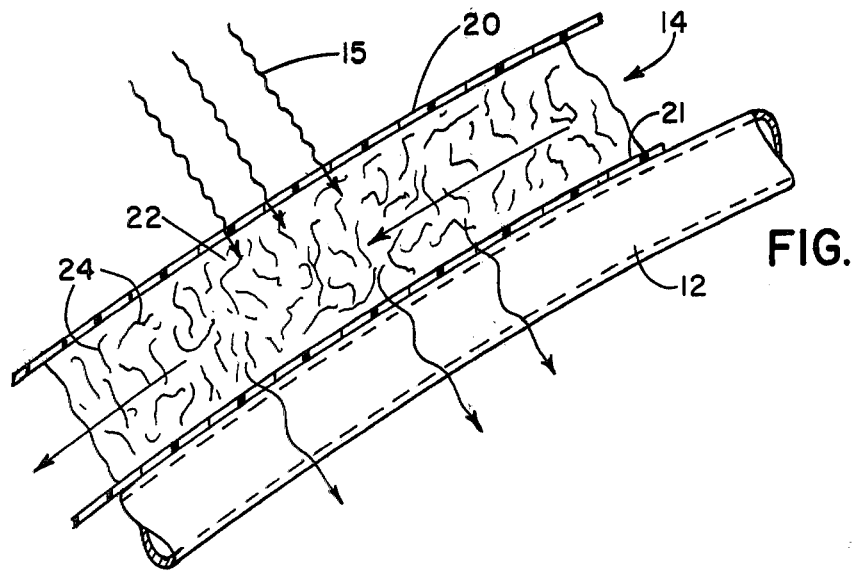
FIG. 2 is an enlarged sectional view of the wall used with the greenhouse of FIG. 1 showing a fibrous mat sandwiched between two radiant energy transmitting imperforate panels to form a solar collector.

In the greenhouse construction of the present invention, the outer wall or panel 14 in a preferred embodiment is made up of an outer radiant transparent membrane or sheet 20 (see FIG. 2) which can be glass, or suitable radiant energy transparent plastic and which is substantially imperforate, and an inner radiant energy transmitting membrane or sheet 21, which is spaced from the sheet 20 and generally is coextensive with it to form an open channel between the two sheets of material. The sheet 21 in the form shown in FIG. 2 is supported directly on the curved frame members 12, and thus is supported in position to form the wall 14 for the greenhouse. The term "wall" as used herein is used in a broad sense, and means side walls or overhead walls (roofs).

The two sheets 20 and 21 may be spaced apart with suitable dividers or supports in any desired manner, or they can merely be supported on the fibrous mat, or fiber matrix 22 that is positioned beween the sheets of material 20 and 21. The fibrous mat indicated at 22 is made up of fibers in a desired density range, for example, the densities disclosed in my previously mentioned U.S. Pat. No. 4,212,292. The mat is sufficiently low in density so that radiant energy indicated by arrows 15 will be transmitted at least partially through the mat, and some energy of light passes through both of the sheets 20 and 21 into the interior of the greenhouse as shown by the arrows 23.

Additionally, the fibers carry a fluorescent pigment or dye selected in accordance with the teaching of U.S. Pat. No. 3,352,058. The fibers may be made of a plastic or glass material which contains the fluorescent chemical pigments within the fibers, or the pigment may be applied as fluorescent paint or pigmentation directly to the surface of the fibers in the fibrous mat.

The open fibrous mat 22 is sufficiently open so that the pigmentation can be sprayed on the fibers after the mat has been formed.

In operation, solar radiation enters through the outer transmitting sheet or membrane 20 and becomes partially absorbed by impinging upon the individual fibers which are shown at 24, and because the fibers each carry fluorescent pigments, some of the light or radiant energy that is absorbed by a fiber is subsequently reemitted by the fluorescent pigment. Importantly, the wave length at which this light is reemitted becomes shifted toward the longer wave lengths, as a result of the fluorescent nature of the pigment. For example, an orange fluorescent pigment is able to absorb wave lengths in the green area of the visible solar spectrum and then reemit this energy in the orange portion of the spectrum. Since most green plants can efficiently utilize red, orange and blue wave lengths of the spectrum, but inefficiently utilize green wave lengths, the absorption by the fluorescent pigments on the fibers of the energy in the green portion of the spectrum and its reemission in the red or orange portion constitutes an effective enhancement of the usable solar energy for a growing plant. Because the matrix or fiber mat 22 is transparent at least in part to solar radiation, much of the light which has been reemitted by the fluorescent pigment will pass on through the fibrous mat and therefore will be available for absorption by the plants in the greenhouse.

Some of the light or solar energy which is initially absorbed by the pigment of the fibers and by the fibers themselves will not be reemitted by the fluorescent chemicals but instead becomes converted into heat. In the form of the invention shown in FIG. 2, this heat is utilized by using the assembly of the mat 22 between plates 20 and 21 as a solar collector. In a greenhouse construction as shown in FIG. 1, this is accomplished by having a fan or other means for moving air indicated generally at 30 forcing air into inlets 31 and 32 near the top of the walls 14, and this air under pressure then moves downwardly as indicated by the arrow 33 in FIG. 2 through the spaces defined in the fibrous mat, where the heat is transferred to the air.

Outlet ducts indicated at 34 can be provided for outlet of heated air into the interior of the greenhouse for heating purposes, or the outlets can be connected to suitable heat storage means. The heated air also can be used to heat some other structure such as a house or commercial building in the immediate area.

Another significant feature of the use of the mat 22 such as that shown in FIG. 2 is that the insulating qualities of the structure or greenhouse are significantly enhanced. For example, a typical three inch thick layer of the mat 22 will provide an "R" factor of approximately 9, as compared to an R factor of only approximately 2 where the mat is not used between two sheets 20 and 21 of a transparent material such as glass or plastic. Thus, the greenhouse does not become as much of an energy consumer as normally encountered, and may even become a net heat source when the insulating properties of the mat are added to the heat transfer properties of the fibrous mat.

The use of the fluorescent paints insure that the transmission of radiant energy or light is sufficiently high so that the green plant growth is enhanced at the same time heat is extracted.

Actual tests utilizing orange-red, red and cerise paints manufactured by Radiant Color Division of Hercules Inc., 2800 Radiant Avenue, Richmond, Calif. 94804 have indicated that these colors are satisfactory, and the fluorescent qualities causing the retransmission of radiant energy or light resulted in actual tests of green plant growth significantly greater than plants subjected to light transmitted either by a similar matrix of fiber without the pigmentation, or through a layer of window glass only.

Figure 3:
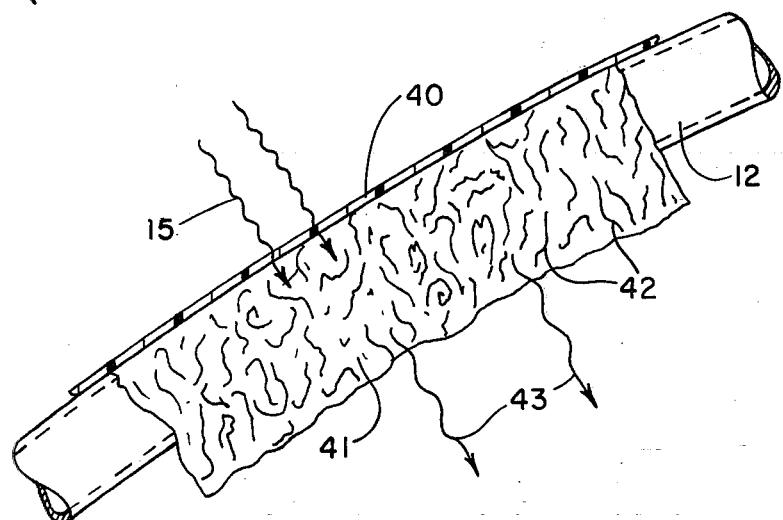
FIG. 3 is an enlarged vertical sectional view of a wall portion of the greenhouse of FIG. 1 showing a modified construction of the present invention.

In a second embodiment of the invention shown in FIG. 3, the frame members 12 directly support a single sheet 40 of imperforate radiant energy transmitting material, such as glass or suitable plastic, and a fibrous matrix or mat 41 is mounted to the panel 40 in a suitable manner. The mat itself can be cemented to the glass panel along its upper (outer) surface, or if desired, a loosely woven net or other material support on the interior surface of the mat can be used to hold the mat against the panel 40.

The fibers 42 in the mat 41 are spaced sufficiently so that the mat transmits radiant energy as indicated by the arrows 43 in the same manner as the previous mat 22, and the fibers each carry a fluorescent pigment or paint so that the radiant energy reemission properties are provided as with the previous matrix or mat.

In this particular instance, however, there is no second sheet or panel forming a duct for air flow. However, the fibrous mat 41 still continues to provide insulation, significantly increasing the R value of the wall structure 14, and at the same time providing for the reemission of radiant energy absorbed by the fibers because of the use of the fluorescent chemicals or pigments. Thus the form of the invention of FIG. 3 enhances green plant growth within the greenhouse while having insulating layers that significantly reduce heat loss on the walls.

As disclosed in U.S. Pat. No. 4,212,292, a suitable overall material density for absorbers also can be specified in terms relating to fiber thickness (t); the density of the material composing the fiber (df); and the overall density of the absorber mat (dm). In this regard, it has been found that the acceptable value of "dm" (overall density of the fibrous mat) is bounded by the following:

"dm" must be greater than the quantity, $$0.12 \times t \times df.$$

however, "dm" must be less than the quantity, $$0.8 \times t \times df.$$

In these relationships, "t" is expressed in centimeters, and "df" and "dm" are expressed in grams/cm.$^3$.

Specifically, tested matrixes utilized in the greenhouse have indicated that a fiber diameter (t) of approximately 0.005 cm, a fiber density of approximately 2.7 gm/cm$^3$, and an overall matrix density of approximately 6 ounces per cubic foot (0.006 gm/cm$^3$) works particularly well. A matrix composed of fibers having a diameter of approximately 0.005 to 0.010 cm, with fiber density approximately 1 gm/cm$^3$ and with the overall matrix density of approximately 2 ounces per cubic foot (0.002 gm/cm$^3$) has also been found to work well.

The density of the fibrous matrix should be such that a portion of the sunlight passes completely through the fiber mat (this is related to the thickness of the mat, which generally is in the range of 3" or so) and these last mentioned overall densities (2 to 6 oz/ft$^3$) have provided this type of transmissivity.

In the matrix disclosed solar radiation will penetrate a significant distance into the matrix, where it may be absorbed by successive collisions with the fibers. It has also been found that if the matrix is unpigmented, some solar radiation will pass through even several inches of the matrix. In the above example, when a fiber diameter of 0.05 mm is used, together with a fiber density of 2.7 gm/cm$^3$ and a matrix density of approximately 6 ounces per cubic foot is used, approximately ⅓ of the incident solar radiation penetrated a three inch thick matrix when the fibers are unpigmented, as in the case of ordinary glass fibers. Consequently, the use of this matrix as an insulating medium in a greenhouse wall or roof allows that structural member to transmit some solar radiation and also allows the effective "R" factor of the wall member to be substantially improved.

Further, the feature of providing the fibers with a fluorescent pigment which is carried by the fibers provides for conversion to heat of some of the shorter wave lengths that are absorbed by the fibers and are not reemitted and which would not be efficiently utilized by the plants. The energy which is not reemitted is not lost with the present device particularly where the unit is used as an air collector. Finally, where the matrix is supported only on one outer panel, the benefits of insulation are provided without any further construction. This construction also aids by retaining heat in the mat and helping to keep the greenhouse warm in cold weather.

It should be noted that the term "wall" as used herein is meant to include a roof, or side walls, or end walls of a greenhouse. The wall panel being claimed is one which is positioned to permit solar energy to enter the interior of a building.

What is claimed is:

1. A greenhouse construction comprising a greenhouse frame, said frame defining wall means enclosing an interior chamber and having an upper portion, a wall member supported on said frame comprising a pair of light transmissive sheets of material spaced apart and generally coextensive, and a filling of fibers forming a fiber matrix between said sheets of material, said fiber matrix being of a density to permit light to be transmitted therethrough, and of a thickness to provide a significant increase in insulation properties to the sheets of material to reduce heat losses from said greenhouse, said fibers carrying a selected fluorescent pigment over a substantial portion of each of the fibers in the matrix, said pigments being selected to provide for reemission of radiation energy absorbed by the fluorescent pigments in longer wavelengths than that which are absorbed, and fan means adjacent the upper portions of said framework to force air through the fibrous matrix between said light transmissive sheets, and an air outlet near the bottom of the greenhouse to permit air to be discharged from the matrix into the greenhouse to provide for solar heating and for enhanced radiation in the wavelengths that stimulate plant growth.

2. The greenhouse of claim 1 wherein said matrix has a thickness of at least three inches to significantly increase the insulation value of the wall member.

3. The combination as specified in claim 1 wherein the fiber diameter ranges between approximately 0.05 to 0.10 mm, the fiber density is in the range of 1.0 gm/cm to 2.7 gm/cm, and the overall matrix density ranges from between 2 ounces per cubic foot to 6 ounces per cubic foot.

4. The combination as specified in claim 1 wherein said fiber matrix mean density (dm) ranges in density substantially between a lower limit of $0.12 \times t \times df$ and an upper limit of $0.8 \times t \times df$ where t is the fiber diameter in centimeters and df is the density of fibers, the quantities df and dm being expressed in gm/cm$^2$.

5. The combination as specified in claim 1 wherein said fibers are comprised of material impregnated with fluorescent pigment chemicals.

6. The combination as specified in claim 1 wherein said fibers are coated with a pigment of fluorescent material.

* * * * *